US 12,243,242 B2

United States Patent
Hu et al.

(10) Patent No.: US 12,243,242 B2
(45) Date of Patent: Mar. 4, 2025

(54) MULTI-TARGET TRACKING METHOD, DEVICE AND COMPUTER-READABLE STORAGE MEDIUM

(71) Applicant: UBTECH ROBOTICS CORP LTD, Shenzhen (CN)

(72) Inventors: Shuping Hu, Shenzhen (CN); Jun Cheng, Shenzhen (CN); Jingtao Zhang, Shenzhen (CN); Miaochen Guo, Shenzhen (CN); Dong Wang, Shenzhen (CN); Zaiwang Gu, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 393 days.

(21) Appl. No.: 17/866,574

(22) Filed: Jul. 18, 2022

(65) Prior Publication Data

US 2022/0375106 A1 Nov. 24, 2022

Related U.S. Application Data

(63) Continuation of application No. PCT/CN2021/131679, filed on Nov. 19, 2021.

(30) Foreign Application Priority Data

Mar. 30, 2021 (CN) .......................... 202110343336.8

(51) Int. Cl.
*G06T 7/246* (2017.01)
*G06T 7/70* (2017.01)
*G06T 7/73* (2017.01)

(52) U.S. Cl.
CPC ................ *G06T 7/246* (2017.01); *G06T 7/73* (2017.01); *G06T 7/70* (2017.01)

(58) Field of Classification Search
None
See application file for complete search history.

(56) References Cited

U.S. PATENT DOCUMENTS

| 2007/0039030 A1* | 2/2007 | Romanowich | H04N 23/90 348/E7.071 |
| 2010/0021009 A1* | 1/2010 | Yao | G06V 20/54 382/103 |

FOREIGN PATENT DOCUMENTS

| CN | 102087702 A | 6/2011 |
| CN | 107316317 A | 11/2017 |
| CN | 111640140 A | 9/2020 |

* cited by examiner

*Primary Examiner* — Darryl V Dottin

(57) ABSTRACT

A method includes: performing target detection on a current image to obtain detection information of a plurality of detected targets; obtaining position prediction information of each of a plurality of tracked targets and a number of times of tracking losses of targets from tracking information of each of the tracked targets, and determining a first matching threshold for each of the tracked targets according to the number of times of tracking losses of targets; calculating a motion matching degree between each of the tracked targets and each of the detected targets according to the position detection information and the position prediction information; for each of the tracked targets, obtaining a motion matching result according to the motion matching degree and the first matching threshold corresponding to the tracked target; and matching the detected targets and the tracked targets according to the motion matching results to obtain a tracking result.

20 Claims, 7 Drawing Sheets

|   | A | B | C | Trackers |
|---|---|---|---|---|
| 1 | 3.3 | 4.0 | 2.1 | |
| 2 | 6.7 | 12.5 | 13.6 | |
| 3 | 9.2 | 10.1 | 7.1 | | dets

Mahalanobis Distance
Matching Matrix

1

| 3.3 | 4.0 | 2.1 |
|---|---|---|
| 6.7 | 10000 | 10000 |
| 9.2 | 10000 | 7.1 |

Matrix after Filtering in Case
of Number of Times of
Tracking Losses is less than 5

2

| 3.3 | 4.0 | 2.1 |
|---|---|---|
| 6.7 | 10000 | 10000 |
| 10000 | 10000 | 7.1 |

Matrix after Filtering in Case
of Number of Times of
Tracking Losses is greater
than 5 and less than 10

MULTI-TARGET TRACKING METHOD, DEVICE AND COMPUTER-READABLE STORAGE MEDIUM

CROSS REFERENCE TO RELATED APPLICATIONS

The present application is a continuation-application of International Application PCT/CN2021/131679, with an international filing date of Nov. 19, 2021, which claims foreign priority of Chinese Patent Application No. 202110343336.8, filed on Mar. 30, 2021 in the China National Intellectual Property Administration of China, the contents of all of which are hereby incorporated by reference.

BACKGROUND

1. Technical Field

The present disclosure generally relates to image processing, and particularly to a multi-target tracking method, device, and computer-readable storage medium.

2. Description of Related Art

With the development of artificial intelligence technology, the technology of target recognition and tracking based on images is applied in areas such as security, human-computer interaction, etc. With such technology, it can detect and track desired targets in a specific area, count the number of the desired targets in a specific area in real time, count real-time pedestrian volume, etc.

In a conventional multiple target tracking method, the similarity between the position of each detected target in an image and the predicted position of each tracked target is first calculated. Then, according to a preset fixed similarity threshold, based on the foregoing similarity, it is determined whether each detected target and each tracked target are similar in motion. The detected targets and the tracked targets are matched to complete the multi target tracking. However, the reliability of the predicted positions is related to the number of times of tracking losses of targets. If this factor is ignored, the determination of whether the motion is related will be inaccurate, which will lead to mismatch, that is, a tracking error.

Therefore, there is a need to provide a multi-target tracking method to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views. Obviously, the drawings in the following description are only some embodiments of the present disclosure. For those of ordinary skill in the art, other drawings can be obtained based on these drawings without creative labor.

FIG. 4 is a schematic diagram of a motion information matching matrix filtered based on different Mahalanobis distance thresholds according to one embodiment.

DETAILED DESCRIPTION

Figure 1:
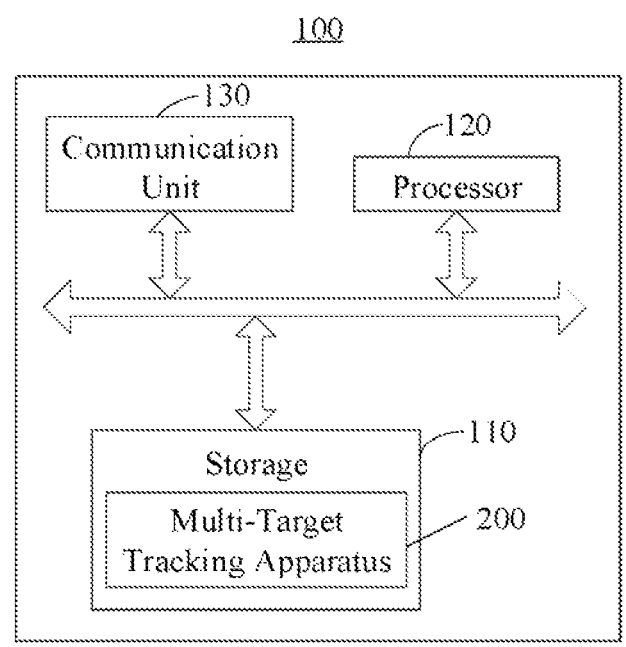
FIG. 1 is a schematic block diagram of an electronic device according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

In the fields of security and human-computer interaction, target detection and counting can be performed on a current image in order to obtain corresponding information, based on which corresponding measures can be taken. At present, there are mainly the following three schemes for target detection and counting. The targets can be objects set according to actual needs, such as a desired group of people (e.g., people without safety helmets). Taking humans as detection objects as an example, the three schemes are briefly described below.

The first scheme is to perform detection and counting on a current image directly based on an object detection algorithm. Specifically, each time a frame of image is acquired, persons appearing in the image are counted, and the portions where each person is located in the current image is extracted and uploaded to the backend. One problem with the first scheme is that when the same person appears a specific area, the images of the person will be repeatedly uploaded or counted many times, resulting in redundant information and waste of resources. For example, assuming that only Person 1 appears in the first frame of image, and only Person 1 appears in the second frame of image, the counted number of detected targets should be 1 instead of 2. If the counted number of detected target is 2, then duplicate counting occurs.

The second scheme is to count the pedestrian volume based on crowd density estimation. Similarly, the second scheme also processes the current image. But instead of using a target detection algorithm, the second scheme uses an algorithm to estimate the crowd density in the current image, and then count the number of people appearing in the image. Compared with the first scheme, this scheme is more suitable for the situation where there are dense crowds in the image. However, there is still the problem of duplicate counting, and it is impossible to crop and upload the portion of a desired group of people in the image.

Since the foregoing two schemes have the problem of duplicate counting, the third scheme is generally adopted. Specifically, based on multi-target tracking algorithms, target deduplication is performed, and the detection and counting functions of desired crowds are realized. Mainstream multi-target tracking algorithms include, but are not limited to, Sort algorithm, Deep Sort algorithm, etc. The use of multi-target tracking algorithms can effectively realize target deduplication.

In some multi-target tracking algorithms, the similarity between the position of each detected target in an image and the predicted position of each tracked target first calculated. Then, according to a preset fixed similarity threshold, based on the foregoing similarity, it is determined whether each detected target and each tracked target are similar in motion. The detected targets and the tracked targets are matched to complete the multi target racking. However, the reliability of the predicted positions is related to the number of times of tracking losses of targets. If this factor is ignored, the determination of whether the motion is related will be inaccurate, which will lead to a mismatch, that is, a tracking error.

For example, in the Deep Sort algorithm, due to the low angle of view of a camera (e.g., the angle of view of a camera of a security robot) or the influence of factors such as the occlusion of human bodies, human body overlap and occlusion will occur in the captured images. When this occurs, tracking loss of targets may occur. After tracking loss of targets occurs, there will be some mismatching problems caused by ignoring the relationship between the reliability of position prediction and the number of times of tracking losses if the original threshold for determining whether the motions are similar is still used.

In the embodiments of the present disclosure, a first matching threshold is determined based on the number of times of tracking losses, and then the detected targets and the tracked targets are matched according to the first matching threshold and position prediction information corresponding to each tracked target, and the position information of each detected target, to obtain a tracking result, which can improve the foregoing situation.

Some embodiments of the present disclosure will be described in detail below with reference to the accompanying drawings. The embodiments described below and features in the embodiments may be combined with each other without conflict.

FIG. 1 is a schematic block diagram of an electronic device 100 according to an embodiment of the present disclosure. The electronic device 100 may be, but not limited to, a computer, a server, and the like. The electronic device 100 may include a storage 110, a processor 120, and a communication unit 130. The storage 110, the processor 120, and the communication unit 130 are directly or indirectly electrically connected to one another to realize data transmission or interaction. For example, these components may be electrically connected to one another through one or more communication buses or signal lines.

Figure 2:
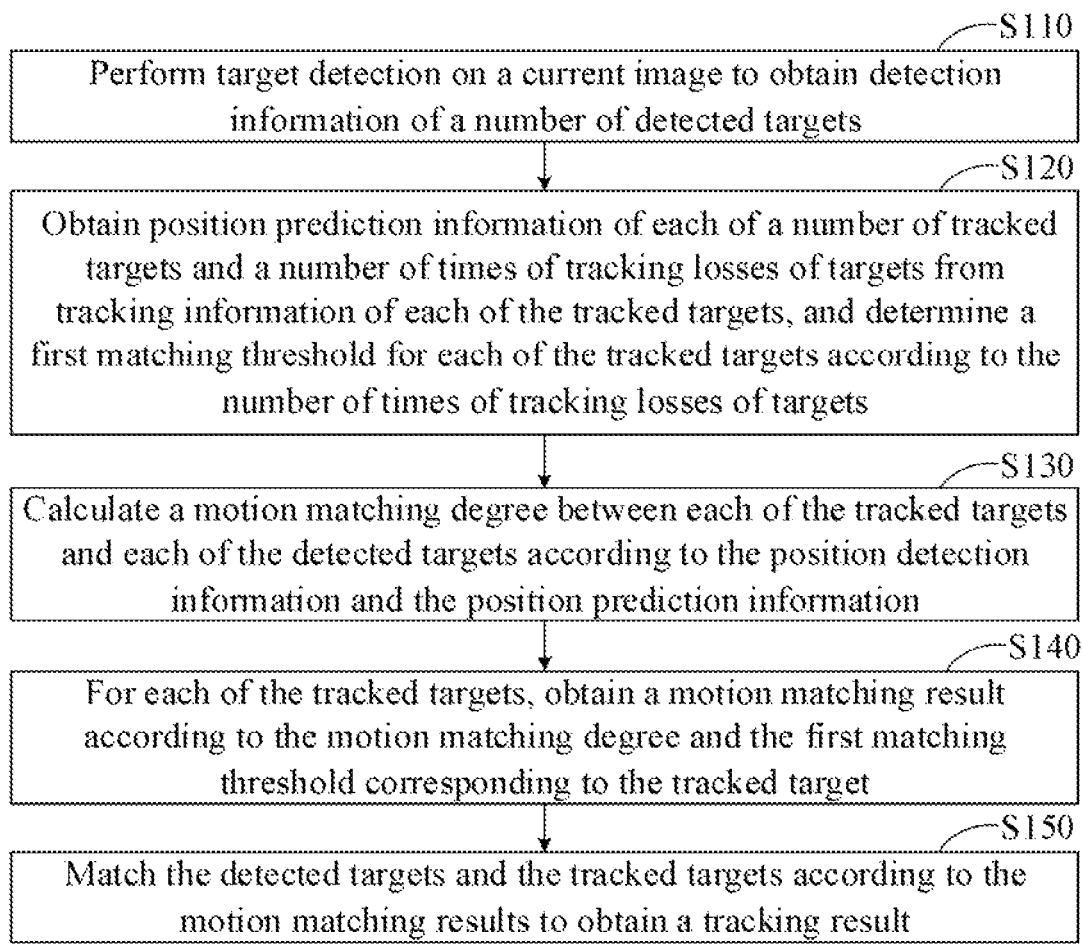
FIG. 2 is an exemplary flowchart of a multi-target tracking method according to one embodiment.

The processor 120 is to perform corresponding operations by executing the executable computer programs stored in the storage 110. When the processor 120 executes the computer programs, the steps in the embodiments of the multi-target tracking method, such as steps S110 to S150 in FIG. 2 are implemented.

The processor 120 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like.

The storage 110 may be an internal storage unit of the electronic device 100, such as a hard disk or a memory. The storage 110 may also be an external storage device of the electronic device 100, such as a plug-in hard disk, a smart memory card (SMC), and a secure digital (SD) card, or any suitable flash cards. Furthermore, the storage 110 may also include both an internal storage unit and an external storage device. The storage 110 is used to store computer programs, other programs, and data required by the electronic device 100. The storage 110 can also be used to temporarily store data that have been output or is about to be output. The storage 110 may be, but is not limited to, a random access memory (RAM), a read-only memory (ROM), a programmable read only memory (PROM), an erasable programmable read-only memory (EPROM), an electrical erasable programmable read-only memory (EEPROM), etc.

Figure 6:
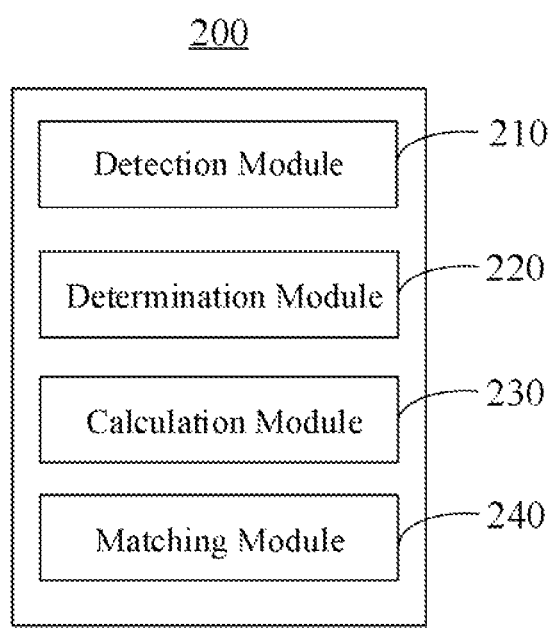
FIG. 6 is a schematic block diagram of a multi-target tracking apparatus according to one embodiment.

Exemplarily, the one or more computer programs may be divided into one or more modules/units, and the one or more modules/units are stored in the storage 110 and executable by the processor 120. The one or more modules/units may be a series of computer program instruction segments capable of performing specific functions, and the instruction segments are used to describe the execution process of the one or more computer programs in the electronic device. For example, the one or more computer programs may be divided into a detection module, a determination module, a calculation module, and a matching module as shown in FIG. 6.

The communication unit 130 is to establish a communication connection between the electronic device 100 and other communication terminals through a network, and to send and receive data through the network.

It should be noted that the structure shown in FIG. 1 is only a schematic structural diagram of the electronic device 100, and the electronic device 100 may further include more or less components than those shown in FIG. 1, or have a different configuration than that shown in FIG. 1. Each component shown in FIG. 1 may be implemented in hardware, software, or a combination thereof.

Referring to FIG. 2, in one embodiment, a multi-target tracking method implemented by the electronic device 100 may include the following steps S110 to S150.

Step S110: Perform target detection on a current image to obtain detection information of a number of detected targets.

In the embodiment, the current image is the image that needs to be used during the current tracking, which is specifically determined by actual situations. Target detection may be performed on the current image according to the preset detection targets to obtain detection information of each detected targets included in the current image. The detection targets are specifically determined according to application scenarios. For example, if people are to be counted, the detection targets are persons, if desired people are to be found, the detection targets are people having desired features (e.g., people without safety helmets).

In one embodiment, a pre-trained target detection model may be used to perform target detection on the current image to obtain detection boxes. The object in the detection boxes are the detected targets. It can be understood that the number of detection boxes is determined by the specific content of the current image and the target detection model. The detection information of each detected target can be obtained based on the detection box in which each detected target is located.

The detection information includes position detection information of the detected targets. The position detection information of a detected target is to indicate the position of the detected target in the current image. For example, the coordinates of the detection box where a detected target is located may be used as the position detection information of the detected target.

Step S120: Obtain position prediction information of each of a number of tracked targets and a number of times of tracking losses of targets from tracking information of each of the tracked targets, and determine a first matching threshold for each of the tracked targets according to the number of times of tracking losses of targets.

Tracked objects represent detected objects that have appeared in images prior to the current image. The stored tracking information of each tracked target may include the position prediction information and the number of times of tracking losses of each tracked target, and the like. That is, the tracking information of one tracked target may include the position prediction information and the number of times of tracking losses of the tracked target. The position prediction information of a tracked target is obtained according to the historical matching situation of the tracked target, and is to describe the predicted position of the tracked target in the current image. The number of times of tracking losses of one tracked target indicates the cumulative number of times that the tracked target does not match the detected targets in the current image. It can be regarded as the duration of tracking loss of the tracked target.

For each tracked target, the position prediction information and the number of times of tracking losses of the tracked target can be obtained from the tracking information of the tracked target. Then, according to a preset relationship between the numbers of times of tracking losses and thresholds, the threshold corresponding to the number of times of tracking losses of the tracked target is determined. The threshold is used as the first matching threshold of the tracked target. By repeating the foregoing process, the first matching thresholds of the tracked targets can be determined according to their numbers of times of tracking losses. The preset relationship between the numbers of times of tracking losses and thresholds can be a linear relationship, such as $y=-kx+b$, where y represents the threshold corresponding to the number of times of tracking losses x, k represents the slope, and b represents a constant. The relationship can be nonlinear relationship, such as $y=-kx^2+b$, y represents the threshold corresponding to the number of times of tracking losses x, and k and b represent preset values. Alternatively, the relationship can be that different ranges of numbers of times of tracking losses correspond to different thresholds. For example, the numbers of times tracking losses a1~a2 corresponding to the threshold of b1, and the numbers of times of tracking losses a2~a3 corresponding to the threshold of b2, which can be set according to actual needs.

Step S130: Calculate a motion matching degree between each of the tracked targets and each of the detected targets according to the position detection information and the position prediction information.

When the position prediction information of each tracked target and the position detection information of each detected target are obtained, the motion matching degree between a tracked target and a detected target can be calculated according to the position prediction information of the tracked target and the position detection information of the detected target. By repeating the foregoing process, the motion matching degree between each tracked target and each detected target can be calculated.

In one embodiment, the motion matching degree can be expressed by Mahalanobis distance. The smaller the Mahalanobis distance is, the greater the motion matching degree expressed by the Mahalanobis distance is. The greater the motion matching degree is, the more similar the motion information is. The Mahalanobis distance can be calculated according to the following equation: $d^{(1)}(i, j) = (d_j - y_i)^T S_i^{-1} (d_j - y_i)$, where $d_j$ represents the position detection information of the jth detected target, $y_i$ represents the position prediction information of the ith tracked target, $d^{(1)}(i, j)$ represents the Mahalanobis distance between $d_j$ and $y_i$, and $S_i$ represents a covariance matrix between the detected position and the average tracked position.

Step S140: For each of the tracked targets, obtain a motion matching result according to the motion matching degree and the first matching threshold corresponding to the tracked target.

After the motion matching degree between each detected target and each tracked target is obtained, for each tracked target, the motion matching degree between the tracked target and each detected target can be compared with the first matching threshold corresponding to the tracked target, to determine whether the tracked target matches one of the detected targets, thereby obtaining a motion matching result. The motion matching result may be motion information matching, or motion information mismatching.

For example, if there are tracked targets A and B, the first matching threshold a of the tracked target A can be determined according to the number of times of tracking losses of the tracked target A, and the first matching threshold b of the tracking target B can be determined according to the number of times of tracking losses of the tracked target B. Then, the motion matching degree between the tracked target A and each detected target is compared with the first matching threshold a, so as to obtain the motion matching result between the tracked target A and each detected target. Similarly, the motion matching degree between the tracked target B and each detected target is compared with the first matching threshold b, so as to obtain the motion matching result between the tracked target B and each detected target.

Step S150: Match the detected targets and the tracked targets according to the motion matching results to obtain a tracking result.

After the motion matching results between each tracked target and each detected target are obtained, any proper matching method (e.g., the minimum cost algorithm) can be used to match the detected targets and the tracked target based on the obtained motion matching results, so as to associate detected targets with corresponding tracked targets, thereby obtaining the tracking result.

If a tracked target is associated with a detected target, it means that the detected target is the tracked target. For example, there are tracked targets A and B, and detected targets 1 and 2. If tracked target A matches detected target 2, it means that tracked target A and detected target 2 are associated, and tracked target A and detected target 2 are the same target.

As discussed above, any proper matching method (e.g., the minimum cost algorithm) can be used to match the detected targets and the tracked target based only on the obtained motion matching results to obtain the tracking result. Alternatively, the motion matching results can be combined with other information, and then the detected targets and the tracked targets are matched to obtain the tracking result. Specifically, it can be determined according to actual needs, which is not detailed here.

Therefore, by using the dynamic first matching thresholds determined by the numbers of times of tracking losses of the tracked targets to determine the motion matching results, and obtaining the tracking result based on the motion matching results, it can avoid mismatching caused by ignoring the relationship between the reliability of position prediction and the number of times of tracking losses, thereby improving tracking reliability.

Figure 3:
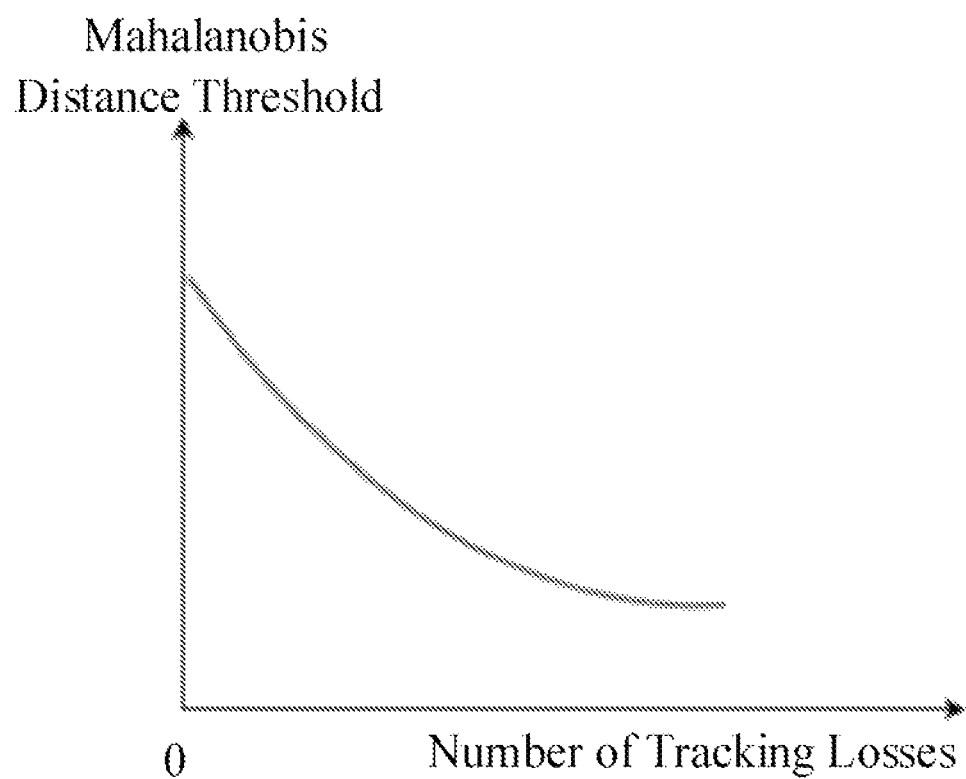
FIG. 3 is a schematic diagram of the relationship between the Mahalanobis distance threshold and the number of times of tracking losses according to one embodiment.

In the embodiment, the greater the number of times of tracking losses is, the greater the first matching threshold corresponding to the number of times of tracking losses is. When the motion matching degree is expressed by the Mahalanobis distance, and the corresponding first matching threshold is expressed by a Mahalanobis distance threshold, the greater the number of times of tracking losses is, the smaller the Mahalanobis distance is. The relationship between them is shown is FIG. 3. It should be noted that FIG. 3 is only a schematic diagram, and does not specifically limit the relationship between the Mahalanobis distance threshold and the number of times of tracking losses.

For each tracked target, the motion matching degree between the tracked target and each detected target may be compared with the first matching threshold corresponding to the tracked target. The detected target corresponding to the motion matching degree greater than the first matching threshold is used as the detected target matched with the motion information of the tracked target. The detected target corresponding to the motion matching degree not greater than the first matching threshold is not used as the detected target matched with the motion information of the tracked target. That is, when the motion matching degree corresponding to the tracked target is greater than the first matching threshold corresponding to the tracked target, it is determined that the position of the tracked target predicted according to motion information of the tracked target matches the detected target corresponding to the motion matching degree. When the motion matching degree corresponding to the tracked target is not greater than the first matching threshold corresponding to the tracked target, it is determined that the position of the tracked target predicted according to motion information does not match the detected target corresponding to the motion matching degree.

In this way, matching pairs matched with the motion information can be determined according to the number of tracking losses. Each matching pair includes a detected target and a corresponding tracked target. The more times a tracked target is lost (that is, the longer the disappearance time), the higher the matching requirements is.

FIG. 4 is a schematic diagram of a motion information matching matrix filtered based on different Mahalanobis distance thresholds according to an embodiment of the present disclosure. The Mahalanobis distance is used to represent the motion matching degree. Assume based on the current image, there are three detected targets 1, 2, 3, and three tracked targets A, B, C, and the Mahalanobis distance matrix of possible matching pairs between the three tracked targets and the detected targets is shown in diagram 1 in FIG. 4. In the diagram 1, the Mahalanobis distances between the tracked target A and the detected targets 1, 2, and 3 are 3.3, 6.7, and 9.2, respectively; the Mahalanobis distances between the tracked target B and the detected targets 1, 2, and 3 are 4.0, 12.5, and 10.1, respectively; and the Mahalanobis distances between the tracked target C and the detected targets 1, 2, and 3 are 2.1, 13.6, and 7.1, respectively.

Assume that the corresponding Mahalanobis distance threshold is 10 when the number of times of tracking losses is less than 5. Then, in the case where the number of times of tracking losses of targets A, B, and C is less than 5, after filtering by using the dynamic Mahalanobis distance of 10, the matching matrix can be shown in diagram 2 in FIG. 4. Specifically, the Mahalanobis distance between the tracked target B and the detected targets 2 and 3, and the Mahalanobis distance between the tracked target C and the detected target 2 can be modified to 10000 to indicate that the tracking target B and the detected targets 2 and 3, and the tracking target C and the detected target 2 are not matching pans of motion information.

Assume that the corresponding Mahalanobis distance threshold is 10 when the number of times of tracking losses is less than 5, and the corresponding Mahalanobis distance threshold is 9 when the number of times of tracking losses is in the range of 5 to 10. Then, in the case where the number of times of tracking losses of tracking targets A, B, and C are all in the range of 5 to 10, after filtering by using the dynamic Mahalanobis distance of 9, the matching matrix can be shown in diagram 3 in FIG. 4. Specifically, the Mahalanobis distance between the tracked target C and the detected target 3, the Mahalanobis distances between the tracked target B and the detected targets 2 and 3, and the Mahalanobis distance between tracked target C and the detected target 2 can be modified to 10000, to a indicate that the tracked target A and the detected target 3, the tracked target B and the detected targets 2 and 3, and the tracked target C and the detected target 2 are not matching pairs of motion information.

It can be seen from FIG. 4 that the dynamic Mahalanobis distance threshold can be used to dynamically filter the possibility of matching between tracked targets and detected targets according to the number of times of tracking losses of tracked targets. The conditions for matching the tracked targets with a long disappearing time and the detected targets are stricter, which can avoid matching errors caused by ignoring the fact that the reliability of position prediction decreases as the number of times of tracking losses increases.

In one embodiment, the detection information may further include first appearance features of the detected targets, and the tracking information may include second appearance features of the tracked targets. The first appearance features may be appearance features obtained by feature extraction based on the portions where the detected targets in the current image are located. When the detection targets are humans, the first appearance feature may be, but not limited to, a person re-identification (ReID) feature. The second appearance feature includes at least one appearance feature of the detected target matched with the tracked target.

Figure 5:
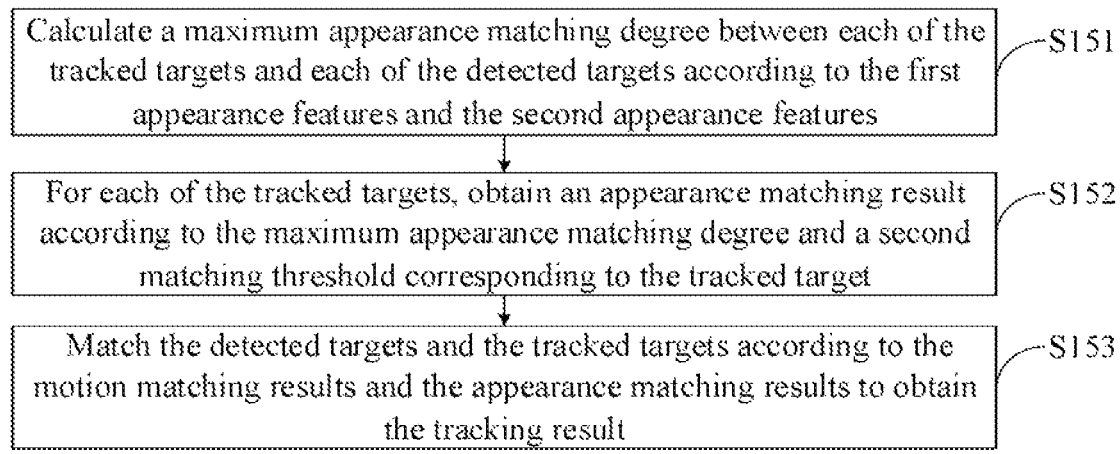
FIG. 5 is an exemplar flowchart of matching detected targets and tracked targets according to one embodiment.

Referring to FIG. 5, in one embodiment, step S150 of FIG. 2 may include steps S151 to S153.

Step S131: Calculate a maximum appearance matching degree between each of the tracked targets and each of the detected targets according to the first appearance features and the second appearance features.

For a tracked target and a detected target, the similarity between the first appearance feature of the detected target and the second appearance features of the tracking target can be calculated, and the maximum similarity among them can be determined as the maximum appearance matching degree between the tracked target and the detected target. By repeating the foregoing process, the maximum appearance matching degree between each tracked target and each detected target can be obtained.

In one embodiment, the above-mentioned appearance matching degree can be expressed by the cosine distance. The smaller the cosine distance is, the greater the appearance matching degree is. The minimum cosine distance corresponding to the maximum appearance matching degree can be calculated according to the following equation: $d^{(2)}(i, j) = \min\{1 - r_j^T r_k^{(i)} | r_k^{(i)} \in R_i\}$, where $d^{(2)}(i, j)$ represents the minimum cosine distance between the first appearance feature of the jth detected target and the second appearance feature of the ith tracked target, $r_j$ represents the first appearance feature of the jth detected target, and $r_k^{(i)}$ represents the kth second appearance feature among all the second appearance features $R_i$ of the ith tracked target.

Step S152: For each of the tracked targets, obtain an appearance matching result according to the maximum appearance matching degree and a second matching threshold corresponding to the tracked target.

After the maximum appearance matching degrees are obtained, each maximum appearance matching degree can be compared with the second matching threshold. The detected target and tracked target corresponding to the maximum appearance matching degree greater than the second matching threshold can be used as the matching pair of appearance information matching. That is, if the maximum appearance matching degree between a detected target and a tracked target is greater than the second matching threshold, it can be determined that the detected target matches the appearance information of the tracked target. Otherwise, if the maximum appearance matching degree between a detected target and a tracked target is not greater than the second matching threshold, it can be determined that the detected target does not match the appearance information of the tracked target. In this way, the appearance matching results can be obtained. The appearance matching result of a detected target and a tracked target may be that the appearance information matches or the appearance information does not match.

Step S153: Match the detected targets and the tracked targets according to the motion matching results and the appearance matching results to obtain the tracking result.

In one embodiment, for a detected target and a tracked target that match in motion information and appearance information, a total matching degree between the detected target and the tracked target can be calculated according to the motion matching degree and the maximum appearance matching degree between the detected target and the tracked target. In one embodiment, according to a preset motion matching degree weight, a preset appearance matching degree weight, the motion matching degree and the maximum appearance matching degree corresponding to a detected target and a tracked target that match in motion information and appearance information, the total matching degree between the detected target and the tracked target that match in motion information and appearance information can be calculated by weighted summation. By repeating the foregoing weighted summation, the maximum appearance matching degree between each tracked target and each detected target can be obtained.

Then, a cascading matching mechanism and a minimum cost algorithm can be used to perform matching based on the total matching degrees to determine the matched tracked targets and detected targets. The cascading matching mechanism means that when matching, the tracked targets with a short disappearance time (that is, a small number of times of tracking losses) are matched first, and then the tracked targets with a long disappearance time are matched. In order to facilitate the use of the minimum cost algorithm, the above-mentioned motion matching degree and maximum appearance matching degree can be expressed by distance, so that the minimum cost algorithm can be directly used subsequently without data processing.

In one embodiment, after the tracking result is obtained, for each tracked target matched with a detected target, the tracking information of the tracked target may be updated according to the detected target matched with the tracked target. A tracked target matched with a detected target indicates that the tracked target is matched with the detected target. The updating includes zeroing the number of times of tracking losses of the tracked target and updating the position prediction information.

When updating the position prediction information, the position of a tracked target in the next image can be predicted first, and then the current position prediction information can be replaced with the predicted position information. The position of a tracked target in the next image can be predicted by Kalman filtering or based on a more advanced kinematic model. It can also directly predict that the position of a tracked target in the next image is coincident with the position of the tracked target in the current image. The foregoing prediction method is only for illustration, and the prediction method is not specifically limited here.

When the tracking information includes the second appearance feature, the saved second appearance feature may also be updated according to the first appearance feature of the detected target matched with the tracked target. In one embodiment, an update method may be to add the first appearance feature of the detected target to the tracking information as the second appearance feature in the tracking information.

In one embodiment, for each detected target that does not match any tracked target, the detected target can be regarded as a new tracked target, and the tracking information of the new tracked target can be configured. That is, when tracking based on the next image, matching is performed based on this new tracked target. Optionally, the number of times of tracking losses in the tracking information of the new tracked target may be set to 0.

In one embodiment, for each tracked target that is not matched with any detected target, if the number of times of tracking losses of the tracked target is greater than a preset threshold that can be preset according to actual needs, the tracking of the tracked target may be stopped. The tracking information of the tracked target may be deleted. After this process, when tracking is performed based on the next image, the tracked targets do not include this tracked target.

The tracking information of a tracked target may be updated when the number of times of tracking losses of the tracked target is not greater than the threshold. The updating includes increasing the number of tracking losses, for example, adding 1 to the number of tracking losses in the current tracking information. The updating may also include updating the position prediction information.

The embodiments of the present disclosure provide an improved method based on a conventional multi-target tracking algorithm. Specifically, the first matching threshold is dynamic and determined according to the number of times of tracking losses, rather than being set in advance and applied to all tracked targets. As the number of tracking losses increases, the first matching threshold also increases, making the matching of motion information stricter. In this way, when a tracking result is obtained based on the detected targets and the tracked targets matched based on the motion information, the influence of inaccurate prediction can be reduced, thereby reducing the matching errors.

The method of the embodiments of the present disclosure is described below by taking use of Kalman filtering for position prediction and use of Mahalanobis distance to express the motion matching degree as an example.

When the final matching result is determined only based on the matching of motion information, the greater the number of times of tracking losses of tracking targets (i.e., duration of tracking loss) is, the greater the uncertainty of the predicted position, that is, the greater the variance of the Kalman filter is, which results in a smaller Mahalanobis distance. When the final matching is performed based on the Mahalanobis distance, and an algorithm such as the minimum matching algorithm is used, since the Mahalanobis distance of a tracked target with a large number of times of tracking losses is small, the tracked target with a large number of times of tracking losses will be preferentially matched. That is, when a detected target is matched with multiple tracked targets, the detected target will be preferentially matched with the tracked targets with a large number of times of tracking losses.

In order to avoid the foregoing situation, the Deep Sort algorithm introduces a cascade matching mechanism, so that when matching the detected targets and the tracked targets, the matching is carried out hierarchically. For example, the tracked targets with the number of times of tracking losses of 0 are matched first, and the tracked targets with the number of times of tracking losses of 1 are matched, until all the tracked targets that have not completely disappeared are matched.

Although this approach can solve the aforementioned problems to a certain extent, the cascade matching does not take into account the fact that the reliability of the position prediction information becomes lower as the number of times of tracking losses of tracked targets increases. This approach only introduces cascading matching to solve the mismatching caused by the problem "the greater the number of times of tracking losses of tracking targets is, the greater the uncertainty of the Kalman filter is, that is, the greater the variance of the Kalman filter is, which results in a smaller the Mahalanobis distance." That is, although cascading matching is used, the matching priority of the tracked target with greater number of times of tracking losses is put to the back. No matter how large the number of times of tracking losses is, the Deep Sort algorithm always regards that the position prediction information of each tracked target is equally reliable. This has not changed. Even if the number of times of tracking losses of a tracked target is 20, which means that the result of Kalman filter prediction is seriously unreliable, the tracked target will still be considered for matching if the Mahalanobis distance between the tracked target and a detected target is still smaller than the threshold.

For example, assume that the numbers of times of tracking losses of a tracked target A and a tracked target are 20 and 15, respectively. The disappearance time of the two tracked targets is relatively long, and the reliability of the position prediction of the two tracked targets is reduced. The following situation is possible. That is, after the detected target 1 corresponding to the tracked target A starts to reappear, because the prediction of the tracked target A is not very accurate and the Mahalanobis distance from the detected target 1 is slightly greater than the threshold, the matching possibility of the tracked target A with the detected target 1 is excluded. Although the prediction of the tracked target B is not very accurate either, since the Mahalanobis distance corresponding to detected target 1 just meets the threshold limit, the matching possibility of the tracked target B and the detected target 1 is preserved. As a result, it is very likely that the tracked target B will be matched with the detected target 1. Then the tracking information of the tracked target B will be updated according to the detected target 1, which will lead to a great probability that the tracked target B continues to be matched with the detected target 1 in the next few frames of images, thereby generating a matching error.

The method according to embodiments of the present disclosure introduces a dynamic first matching threshold, and takes the reliability of the prediction into consideration, thereby avoiding matching errors caused by ignoring the reliability of the prediction.

It should be noted that as long as the matching between the position prediction information of the tracked targets and the position detection information of the detected targets is used to obtain the tracking result, the accuracy of the tracking result can be improved and the problem of mismatching can be avoided.

In order to perform the steps in the foregoing embodiments, a multi-target tracking apparatus 200 is provided. The multi-target tracking apparatus 200 may adopt the device structure of the electronic device 100 shown in FIG. 1. FIG. 6 is the schematic block diagrams of the multi-target tracking apparatus 200 according to one embodiment. It should be noted that, the basic principles and technical effects of the multi-target tracking device 200 are the same as those in the foregoing embodiments. For a brief description, for the parts not mentioned in the embodiment, reference may be made to the corresponding content in the foregoing embodiments. The multi-target tracking apparatus 200 may include a detection module 210, a determination module 220, a calculation module 230, and a matching module 240.

The detection module 210 is to perform target detection on a current image to obtain detection information of a number of detected targets. The detection information may include position detection information of the detected targets. The determination module 220 is to obtain position prediction information of each of a number of tracked targets and a number of times of tracking losses of targets from tracking information of each of the tracked targets, and determine a first matching threshold for each of the tracked targets according to the number of times of tracking losses of targets. The calculation module 230 is to calculate a motion matching degree between each of the tracked targets and each of the detected targets according to the position detection information and the position prediction information. The matching module 240 is to, for of the tracked targets, obtain a motion matching result according to the motion matching degree and the first matching threshold corresponding to the tracked target. The matching module 240 is further to match the detected targets and the tracked targets according to the motion matching results to obtain a tracking result.

Figure 7:
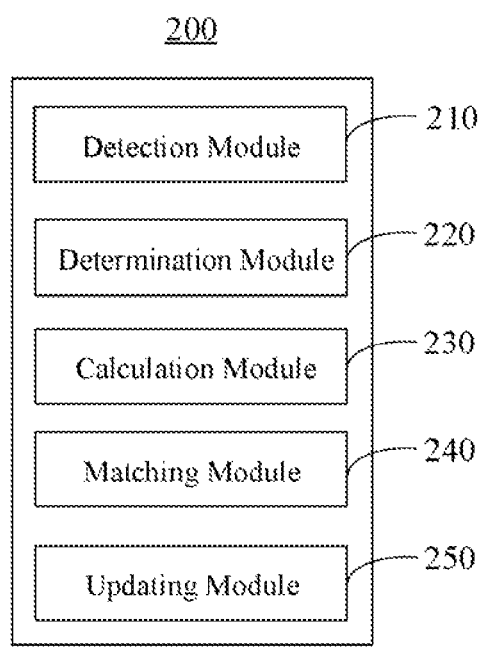
FIG. 7 is a schematic block diagram of a multi target tracking apparatus according to another embodiment.

Referring to FIG. 7, in one embodiment, the multi target tracking apparatus 200 may further include an updating module 250. The updating module 250 is to, for each of the tracked targets matched with one of the detected targets, update the tracking information of the tracked target according to the detected target matched with the tracked target. The updating includes zeroing the number of times of tracking losses of the tracked target and updating the position prediction information.

In one embodiment, the updating module 250 is to, for each of the detected targets having no matching tracked targets, set the detected target as a new tracked target, and configure tracking information for the new tracked target.

In one embodiment, the updating module 250 is to, for each of the tracked targets having no matching detected targets, stopping tracking of the tracked target in response to the number of times of tracking losses of the tracked target being greater than a threshold. The updating module 250 is further to update the tracking information of the tracked target in response to the number of times of tracking losses of the tracked target not being greater than the threshold. The updating includes increasing the number of times of tracking losses and updating the position prediction information.

In one embodiment, the foregoing modules may be stored in the storage 110 shown in FIG. 1 in the form of software, firmware or solidified in the operating system of the electronic device 100, and can be executed by the processor 120 in FIG. 1. Data required to execute the foregoing modules and codes of programs may be stored in the storage 110.

Another aspect of the present disclosure is directed to a non-transitory computer-readable storage medium storing instructions which, when executed, cause one or more processors to perform the methods, as discussed above. The computer-readable storage medium may include volatile or non-volatile, magnetic, semiconductor, tape, optical, removable, non-removable, or other types of computer-readable storage medium or computer-readable storage devices. For example, the computer-readable storage medium may be the storage device or the memory module having the computer instructions stored thereon, as disclosed. In some embodiments, the computer-readable storage medium may be a disc or a flash drive having the computer instructions stored thereon.

In the method and device as discussed above, the first matching threshold corresponding to a tracked target is determined according to the number of times of tracking losses of the tracked target. That is, the first matching threshold corresponding to each tracked target is dynamic. The motion matching result between a tracked target and each detected target is determined according to the first matching threshold, and the tracking result is finally obtained. As a result, it can avoid mismatching caused by ignoring the relationship between the reliability of the position prediction and the number of times of tracking losses, thereby improving the reliability of tracking.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented an the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable storage medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media, it should be: noted that the content contained in the computer readable medium ma be appropriately increased or decreased according to the requirements of legislation and patent practice in the jurisdiction. For example, in some jurisdictions, according to the legislation and patent practice, a computer readable medium does not include electric carrier signals and telecommunication signals.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features: however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented multi-target tracking method, comprising:
   performing target detection on a current image to obtain detection information of a plurality of detected targets, wherein the detection information comprises position detection information of the detected targets;
   obtaining position prediction information of each of a plurality of tracked targets and a number of times of tracking losses of targets from tracking information of each of the tracked targets, and determining a first matching threshold for each of the tracked targets according to the number of times of tracking losses of targets;
   calculating a motion matching degree between each of the tracked targets and each of the detected targets according to the position detection information and the position prediction information;
   for each of the tracked targets, obtaining a motion matching result according to the motion matching degree and the first matching threshold corresponding to the tracked target; and
   matching the detected targets and the tracked targets according to the motion matching results to obtain a tracking result;
   wherein the detection information further comprises first appearance features of the detected targets, and the tracking information comprises second appearance features of the tracked targets, matching the detected targets and the tracked targets according to the motion matching result to obtain the tracking result, comprises:
   calculating a maximum appearance matching degree between each of the tracked targets and each of the detected targets according to the first appearance features and the second appearance features;
   for each of the tracked targets, obtaining an appearance matching result according to the maximum appearance matching degree and a second matching threshold corresponding to the tracked target; and
   matching the detected targets and the tracked targets according to the motion matching results and the appearance matching results to obtain the tracking result; and
   wherein matching the detected targets and the tracked targets according to the motion matching results to obtain the tracking result, comprises:
   for one of the detected targets and one of the tracked targets that are matched in motion information and appearance information thereof, calculating a total matching degree between the one of the detected targets and the one of the tracked targets according to the motion matching degree and the maximum appearance matching degree between the one of the detected targets and the one of the tracked targets; and
   performing a matching based on the total matching degree, and determining matching tracked targets and detected targets, using a cascade matching mechanism and a minimum cost algorithm.

2. The method of claim 1, wherein the first matching threshold corresponding to the number of times of tracking losses of targets increases as the number of times of tracking losses of targets increases, obtaining the motion matching result according to the motion matching degree and the first matching threshold corresponding to the tracked target, comprises:
   in response to the motion matching degree corresponding to the tracked target being greater than the first matching threshold corresponding to the tracked target, determining that a position of the tracked target predicted according to motion information of the tracked target matches one of the detected targets corresponding to the motion matching degree; and
   in response to the motion matching degree corresponding to the tracked target not being greater than the first matching threshold corresponding to the tracked target, determining that the position of the tracked target predicted according to motion information of the tracked target does not match the one of the detected targets corresponding to the motion matching degree.

3. The method of claim 1, further comprising:
   for each of the tracked targets matched with one of the detected targets, updating the tracking information of the tracked target according to the detected target matched with the tracked target.

4. The method of claim 1, further comprising:
   for each of the detected targets having no matching tracked targets, setting the detected target as a new tracked target, and configuring tracking information for the new tracked target.

5. The method of claim 1, further comprising:
   for each of the tracked targets having no matching detected targets, stopping tracking of the tracked target in response to the number of times of tracking losses of the tracked target being greater than a threshold.

6. An electronic device comprising:
   one or more processors; and
   a memory coupled to the one or more processors, the memory storing programs that, when executed, cause the one or more processors to:
   perform target detection on a current image to obtain detection information of a plurality of detected targets, wherein the detection information comprises position detection information of the detected targets;
   obtain position prediction information of each of a plurality of tracked targets and a number of times of tracking losses of targets from tracking information of each of the tracked targets, and determine a first matching threshold for each of the tracked targets according to the number of times of tracking losses of targets;
   calculate a motion matching degree between each of the tracked targets and each of the detected targets according to the position detection information and the position prediction information;
   for each of the tracked targets, obtain a motion matching result according to the motion matching degree and the first matching threshold corresponding to the tracked target; and
   match the detected targets and the tracked targets according to the motion matching results to obtain a tracking result;

wherein the detection information further comprises first appearance features of the detected targets, and the tracking information comprises second appearance features of the tracked targets, to match the detected targets and the tracked targets according to the motion matching result to obtain the tracking result, the programs, when executed, further cause the one or more processors to:

calculate a maximum appearance matching degree between each of the tracked targets and each of the detected targets according to the first appearance features and the second appearance features;

for each of the tracked targets, obtain an appearance matching result according to the maximum appearance matching degree and a second matching threshold corresponding to the tracked target; and match the detected targets and the tracked targets according to the motion matching results and the appearance matching results to obtain the tracking result; and wherein, to match the detected targets and the tracked targets according to the motion matching results to obtain the tracking result, the programs, when executed, further cause the one or more processors to:

for one of the detected targets and one of the tracked targets that are matched in motion information and appearance information thereof, calculate a total matching degree between the one of the detected targets and the one of the tracked targets according to the motion matching degree and the maximum appearance matching degree between the one of the detected targets and the one of the tracked targets; and perform a matching based on the total matching degree, and determine matching tracked targets and detected targets, using a cascade matching mechanism and a minimum cost algorithm.

7. The electronic device of claim 6, wherein the first matching threshold corresponding to the number of times of tracking losses of targets increases as the number of times of tracking losses of targets increases, to obtain the motion matching result according to the motion matching degree and the first matching threshold corresponding to the tracked target, the programs, when executed, further cause the one or more processors to:

in response to the motion matching degree corresponding to the tracked target being greater than the first matching threshold corresponding to the tracked target, determine that a position of the tracked target predicted according to motion information of the tracked target matches one of the detected targets corresponding to the motion matching degree; and in response to the motion matching degree corresponding to the tracked target not being greater than the first matching threshold corresponding to the tracked target, determine that the position of the tracked target predicted according to motion information of the tracked target does not match the one of the detected targets corresponding to the motion matching degree.

8. The electronic device of claim 6, wherein the programs, when executed, further cause the one or more processors to:

for each of the tracked targets matched with one of the detected targets, update the tracking information of the tracked target according to the detected target matched with the tracked target.

9. The electronic device of claim 6, wherein the programs, when executed, further cause the one or more processors to:

for each of the detected targets having no matching tracked targets, set the detected target as a new tracked target, and configure tracking information for the new tracked target.

10. The electronic device of claim 6, wherein the programs, when executed, further cause the one or more processors to:

for each of the tracked targets having no matching detected targets, stop tracking of the tracked target in response to the number of times of tracking losses of the tracked target being greater than a threshold.

11. A non-transitory computer-readable storage medium storing instructions that, when executed by at least one processor, cause the at least one processor to perform a multi-target tracking method, the method comprising:

performing target detection on a current image to obtain detection information of a plurality of detected targets, wherein the detection information comprises position detection information of the detected targets;

obtaining position prediction information of each of a plurality of tracked targets and a number of times of tracking losses of targets from tracking information of each of the tracked targets, and determining a first matching threshold for each of the tracked targets according to the number of times of tracking losses of targets;

calculating a motion matching degree between each of the tracked targets and each of the detected targets according to the position detection information and the position prediction information;

for each of the tracked targets, obtaining a motion matching result according to the motion matching degree and the first matching threshold corresponding to the tracked target; and matching the detected targets and the tracked targets according to the motion matching results to obtain a tracking result;

wherein the detection information further comprises first appearance features of the detected targets, and the tracking information comprises second appearance features of the tracked targets, matching the detected targets and the tracked targets according to the motion matching result to obtain the tracking result, comprises:

calculating a maximum appearance matching degree between each of the tracked targets and each of the detected targets according to the first appearance features and the second appearance features;

for each of the tracked targets, obtaining an appearance matching result according to the maximum appearance matching degree and a second matching threshold corresponding to the tracked target; and matching the detected targets and the tracked targets according to the motion matching results and the appearance matching results to obtain the tracking result; and wherein matching the detected targets and the tracked targets according to the motion matching results to obtain the tracking result, comprises:

for one of the detected targets and one of the tracked targets that are matched in motion information and appearance information thereof, calculating a total matching degree between the one of the detected targets and the one of the tracked targets according to the motion matching degree and the maximum appearance matching degree between the one of the detected targets and the one of the tracked targets; and performing a matching based on the total matching degree, and determining matching tracked targets and detected targets, using a cascade matching mechanism and a minimum cost algorithm.

12. The non-transitory computer-readable storage medium of claim 11, wherein the first matching threshold corresponding to the number of times of tracking losses of targets increases as the number of times of tracking losses of targets increases, obtaining the motion matching result according to the motion matching degree and the first matching threshold corresponding to the tracked target, comprises:
in response to the motion matching degree corresponding to the tracked target being greater than the first matching threshold corresponding to the tracked target, determining that a position of the tracked target predicted according to motion information of the tracked target matches one of the detected targets corresponding to the motion matching degree; and
in response to the motion matching degree corresponding to the tracked target not being greater than the first matching threshold corresponding to the tracked target, determining that the position of the tracked target predicted according to motion information of the tracked target does not match the one of the detected targets corresponding to the motion matching degree.

13. The non-transitory computer-readable storage medium of claim 11, wherein the method further comprises:
for each of the tracked targets matched with one of the detected targets, updating the tracking information of the tracked target according to the detected target matched with the tracked target.

14. The non-transitory computer-readable storage medium of claim 11, wherein the method further comprises:
for each of the detected targets having no matching tracked targets, setting the detected target as a new tracked target, and configuring tracking information for the new tracked target.

15. The non-transitory computer-readable storage medium of claim 11, wherein the method further comprises:
for each of the tracked targets having no matching detected targets, stopping tracking of the tracked target in response to the number of times of tracking losses of the tracked target being greater than a threshold.

16. The non-transitory computer-readable storage medium of claim 11, wherein the position detection information of the detected target is to indicate a position of the detected target in the current image, and coordinates of a detection box where the detected target is located is used as the position detection information of the detected target.

17. The non-transitory computer-readable storage medium of claim 11, wherein the number of times of tracking losses of the tracked target indicates a cumulative number of times that the tracked target does not match the detected targets in the current image, or a duration of tracking loss of the tracked target.

18. The non-transitory computer-readable storage medium of claim 11, wherein, the motion matching degree is expressed by Mahalanobis distance, and wherein smaller the Mahalanobis distance is, greater the motion matching degree expressed by the Mahalanobis distance is.

19. The non-transitory computer-readable storage medium of claim 18, wherein the Mahalanobis distance is calculated according to a following equation:

$$d^{(1)}(i,j)=(d_j-y_i)^T S_i^{-1}(d_j-y_i),$$

where $d_j$ represents position detection information of the j-th detected target, $y_i$ represents position prediction information of the i-th tracked target, $d^{(1)}(i, j)$ represents the Mahalanobis distance between $d_j$ and $y_i$ and $S_i$ represents a covariance matrix between a detected position and an average tracked position.

20. The non-transitory computer-readable storage medium of claim 11, wherein an appearance matching degree between each of the tracked targets and each of the detected targets is expressed by cosine distance, and wherein smaller the cosine distance is, greater the appearance matching degree is.

* * * * *